US011683241B1

(12) United States Patent
Wendeborn et al.

(10) Patent No.: US 11,683,241 B1
(45) Date of Patent: Jun. 20, 2023

(54) FLEXIBLE MODEL TO PROVISION WIRELESS COMMUNICATION SERVICES DIRECTLY TO NETWORK FUNCTION OR NETWORK SUPPORT SYSTEM

(71) Applicant: DISH Wireless L.L.C., Englewood, CO (US)

(72) Inventors: Jeffrey S. Wendeborn, Highlands Ranch, CO (US); Venkata Sai Pavan Nori, Parker, CO (US)

(73) Assignee: DISH WIRELESS L.L.C., Englewood, CO (US)

(*) Notice: Subject to any disclaimer, the term of this patent is extended or adjusted under 35 U.S.C. 154(b) by 0 days.

(21) Appl. No.: 17/887,723

(22) Filed: Aug. 15, 2022

Related U.S. Application Data

(60) Provisional application No. 63/331,086, filed on Apr. 14, 2022.

(51) Int. Cl.
  *G06F 15/173* (2006.01)
  *H04L 41/50* (2022.01)
(52) U.S. Cl.
  CPC .................................. *H04L 41/50* (2013.01)

(58) Field of Classification Search
  None
  See application file for complete search history.

(56) References Cited

U.S. PATENT DOCUMENTS

| | | | |
|---|---|---|---|
| 2017/0078179 A1* | 3/2017 | Dunsbergen | H04L 43/0876 |
| 2017/0093628 A1* | 3/2017 | Lin | H04L 41/12 |
| 2020/0374142 A1* | 11/2020 | Tandon | H04L 49/9068 |

\* cited by examiner

*Primary Examiner* — Thanh T Nguyen
(74) *Attorney, Agent, or Firm* — Seed IP Law Group LLP

(57) ABSTRACT

Systems and method are directed towards dynamically determining how to provision networking services. An order for new wireless service is received for a customer device and a customer identifier is determined for the order. A determination is made whether to process the order via a direct network function or via a network support system based on the customer identifier. In response to determining to process the order via the direct network function, at least one low-level networking service is identified for the order and a separate cloud core is provisioned for each of the at least one low-level networking service. In response to determining to process the order via the network support system, at least one high-level networking service is identified for the order and the network support system is employed to establish the at least one high-level networking service.

20 Claims, 4 Drawing Sheets

FLEXIBLE MODEL TO PROVISION WIRELESS COMMUNICATION SERVICES DIRECTLY TO NETWORK FUNCTION OR NETWORK SUPPORT SYSTEM

TECHNICAL FIELD

The present disclosure relates generally to network provisioning and, more particularly, to dynamically determining how to provision networking services.

BACKGROUND

Description of the Related Art

Smart phones are being used more and more by more and more people. As the use of smart phones has increased, so too has the desire for more reliable, fast, and continuous transmission of content. In an effort to improve the content transmission, networks continue to improve with faster speeds and increased bandwidth. The advent and implementation of 5G technology has resulted in faster speeds and increased bandwidth. The design and deployment of such a wireless network relies on a great number of hardware and computing resources. Unfortunately, different types of computing tasks generally utilize different computing resources, which can increase the amount of overhead needed to support such computing tasks. It is with respect to these and other considerations that the embodiments described herein have been made.

BRIEF SUMMARY

Briefly described, embodiments are directed toward systems and methods of dynamically determining how to provision networking services. An order for new wireless service is received for a customer device and a customer identifier is determined for the order. A determination is made whether to process the order via a direct network function or via a network support system based on the customer identifier. A catalog of networking services may be maintained in a hierarchical structure with low-level networking services being sub-services of high-level networking services.

In response to determining to process the order via the direct network function, at least one low-level networking service is identified for the order and a separate cloud core is provisioned for each of the at least one low-level networking service. In response to determining to process the order via the network support system, at least one high-level networking service is identified for the order and the network support system is employed to establish the at least one high-level networking service. When a second order is received for new wireless service for a second customer, an independent determination is made whether to process the second order via the direct network function or via the network support system.

Identifying the at least one low-level networking service for the order may include selecting a first application programming interface end point associated with a first target low-level networking service and selecting a second application programming interface end point associated with a second target low-level networking service. To provision the separate cloud core for each of the at least one low-level networking service, the first application programming interface end point may be employed to call a first cloud core for the first target low-level networking service and the second application programming interface end point may be employed to call a second cloud core for the second target low-level networking service.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
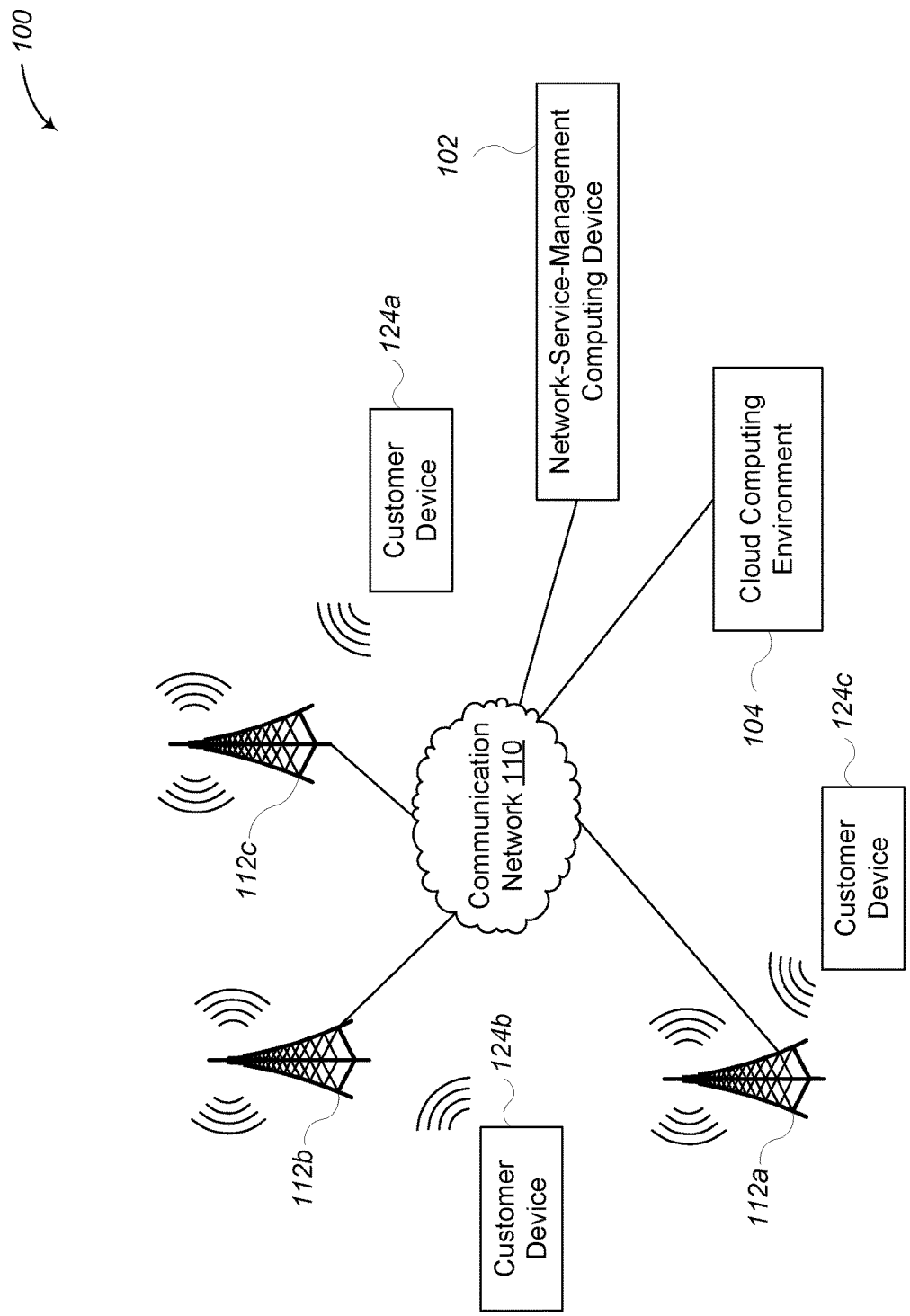
FIG. 1 illustrates a context diagram of an environment for dynamically determining how to provision networking services in accordance with embodiments described herein.

FIG. 1 illustrates a context diagram of an environment for dynamically determining how to provision networking services in accordance with embodiments described herein. Environment 100 includes a plurality of cells 112a-112c, a plurality of customer or user devices 124a-124b, a network-service-management computing device 102, a cloud computing environment 104, and a communication network 110.

The customer devices 124a-124c are computing devices that receive and transmit cellular communication messages with the cells 112a-112c. Examples of customer devices 124a-124c may include, but are not limited to, mobile devices, smartphones, tablets, cellular-enabled laptop computers, or other computing devices that can communication with a cellular network.

The cells 112a-112c are cellular towers that together provide the hardware infrastructure of a cellular communications network, e.g., a 5G cellular communications network. The cells 112a-112c may include or be in communication with base stations, radio back haul equipment, antennas, or other devices, which are not illustrated for ease of discussion. In various embodiments, the cells 112a-112c may communicate with each other via communication network 110. Communication network 110 includes one or more wired or wireless networks, which may include a series of smaller or private connected networks that carry information between the cells 112a-112c.

The cloud computing environment 104 is a collection of computing resources that can be utilized to form separate virtual computing environments for use by computing devices. These virtual computing environments can be provisioned as cloud-computing cores to perform functionality associated with a particular networking service.

The network-service-management computing device 102 is configured to manage orders for new wireless services for customer devices 124a-124b, such as when a new customer device 124 requests access to join the communication network or is setup to join the communication network. The network-service-management computing device 102 determines which networking services are to be setup and initialized for that new customer device 124 based on the order received for that customer device 124. In particular, the network-service-management computing device 102 determines whether to process the order via a direct network function or via a network support system based on the customer identifier. The network-service-management computing device 102 can communicate with the cloud computing environment 104 to provision separate cloud-computing cores for separate networking services for that customer device 124. As described herein, the networking services may be specific network functions (e.g., management of data usage for the customer device, management of voice usage for the customer device, management of messaging usage for the customer device, etc.), test environments (e.g., device-specific testing, load balancing testing, etc.), or other functionality to facilitate and manage the communication network.

Figure 2:
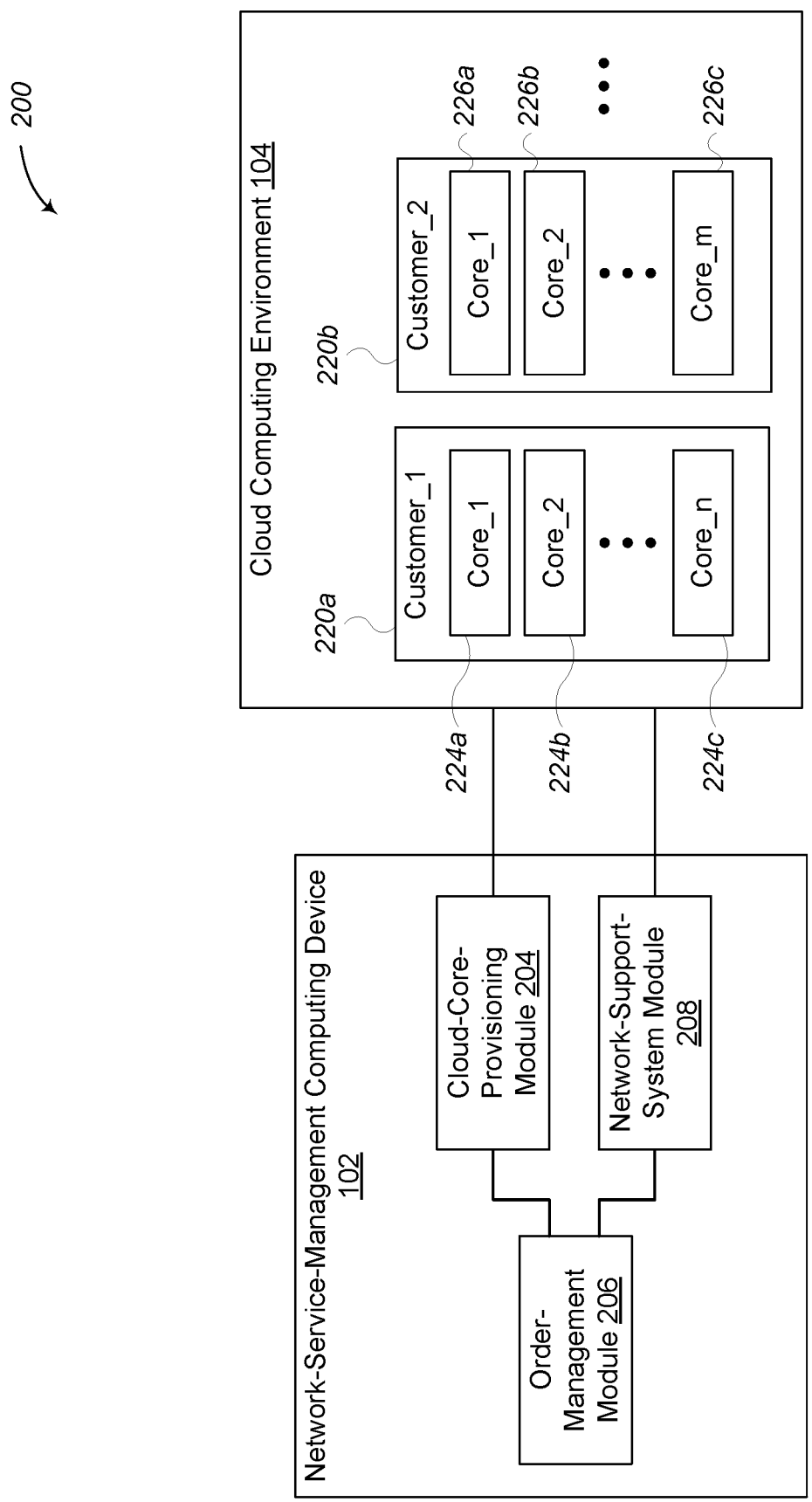
FIG. 2 is a context diagram of a non-limiting embodiment of systems that provide functionality to dynamically determining how to provision networking services in accordance with embodiments described herein.

FIG. 2 is a context diagram of a non-limiting embodiment of systems that provide functionality to dynamically determining how to provision networking services in accordance with embodiments described herein. Example 200 includes network-service-management computing device 102 and cloud computing environment 104, similar to the network-service-management computing device 102 and the cloud computing environment 104 shown in FIG. 1.

The network-service-management computing device 102 is configured to manage new wireless service orders. The network-service-management computing device 102 may include a cloud-core-provisioning module 204, an order-management module 206, and a network-support-system module 208. The order-management module 206 is configured to receive orders for new wireless services. These orders may be received from a customer device that is being added to the wireless communication network, or they may be generated by the order-management module 206 on behalf of a customer device.

The order-management module 206 determining whether to process the order via a direct network function or via a network support system based on the customer identifier. In response to determining that the order is to be processed via direct network function, the order-management module 206 determines which low-level networking services are to be used or initialized for that order. The order-management module 206 communicates those low-level networking services to the cloud-core-provisioning module 204. The cloud-core-provisioning module 204 utilizes API end points that are associated with the low-level networking services to provision cloud-computing cores in the cloud computing environment 104. In response to determining that the order is to be processed via the network support system, the order-management module 206 determines which high-level networking services are to be used or initialized for that order. The order-management module 206 communicates those high-level networking services to the network-support-system module 208. The network-support-system module 208 establishes the high-level networking services. In some embodiments, the network-support-system module 208 may perform a variety of functions that establish, support, and maintain the communication network. In at least one embodiment, the network-support-system module 208 may provision one or more cloud-computing cores in the cloud-computing environment 104 to perform the functionality of the high-level networking services.

Although the cloud-core-provisioning module 204, the order-management module 206, and the network-support-system module 208 are illustrated as separate modules, embodiments are not so limited. Rather, functionality of the cloud-core-provisioning module 204, the order-management module 206, and the network-support-system module 208 may be performed by a single module or a plurality of modules.

The cloud computing environment 104 provisions and maintains cloud-computing cores for the different networking services being established for different customers. In this illustrative example, the cloud computing environment 104 has provisioned cores 224a-224c for customer 220a and has provisioned cores 226a-226c for customer 220b. Each separate core is provisioned to perform the functionality of a different low-level or high-level networking service.

Figure 3:
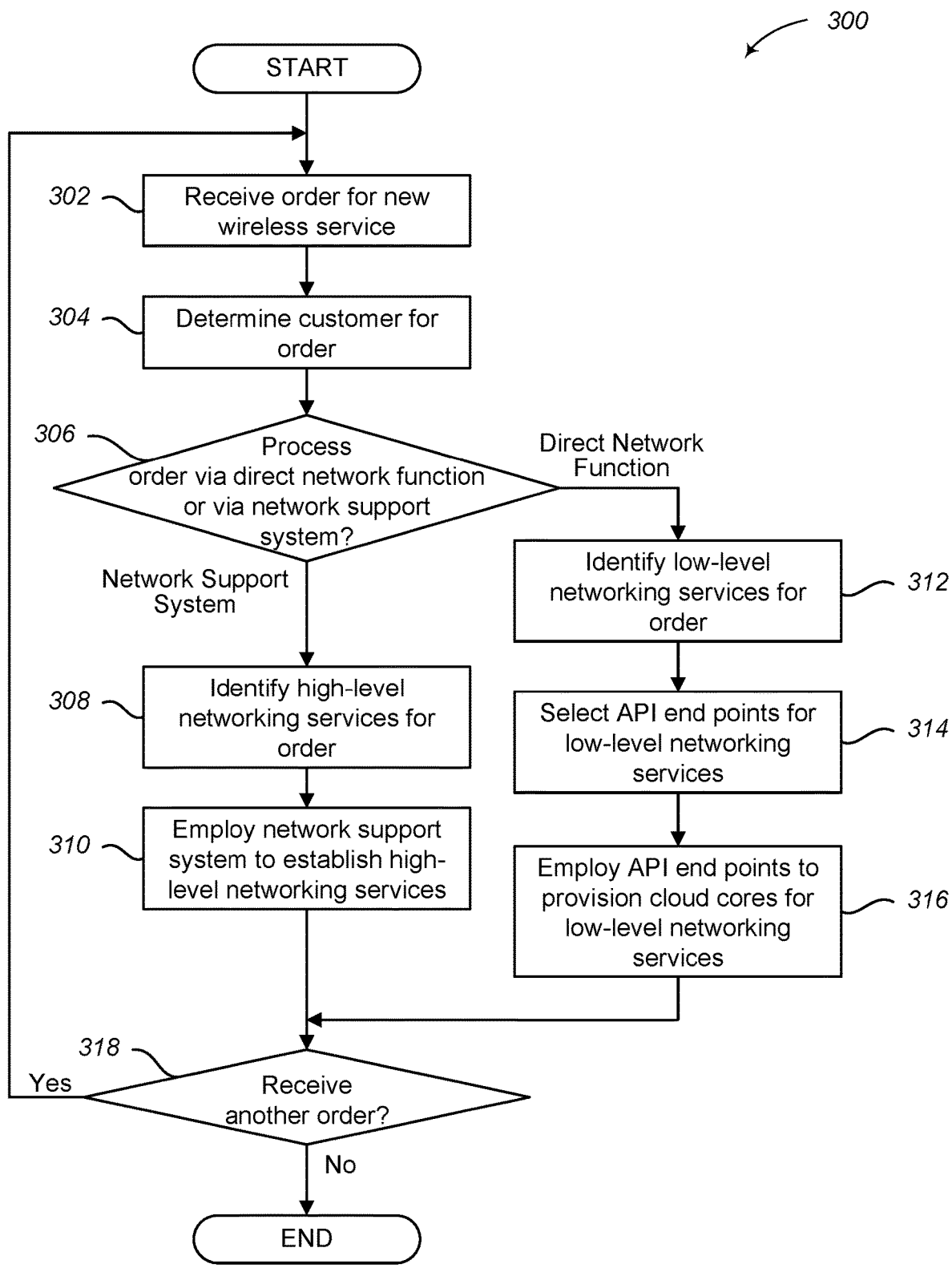
FIG. 3 illustrates a logical flow diagram showing one embodiment of a process for dynamically determining how to provision networking services in accordance with embodiments described herein.

FIG. 3 illustrates a logical flow diagram showing one embodiment of a process 300 for dynamically determining how to provision networking services in accordance with embodiments described herein. In at least one of various embodiments, process 300 may be implemented by or executed via circuitry or on one or more computing devices, such as network-service-management computing device 102 in FIG. 1.

Process 300 begins, after a start block, at block 302 where an order for new wireless service is received for a customer device. In some embodiments, the order may be to establish networking services for a new customer. In other embodiments, the order may also be to change or modify networking services for an existing customer. For example, the order may be to change from a data networking service to a messaging networking service for an existing customer. In various embodiments, the order identifies the customer associated with the device and the new wireless service. The order may also indicate which networking services are to be employed for that customer, such as data, voice, messaging, device management, subscription, roaming, etc.

Process 300 continues next at block 304, where a customer is determined for the order. In various embodiments, the order itself may include a customer identifier that is used to determine the customer. In other embodiments, a database that maps customer devices to customer identifiers or customer identification may be accessed using the customer device information in the order to determine the customer identifier or customer identification. In yet other embodiments, the customer may be defined using one or more characteristics or attributes of the customer, such as geographic area where the customer resides, types of networking services being requested, type of network request (e.g., private or public network access, or sub-network access), type of customer devices requesting access, or other demographic or network information. Process 300 proceeds to decision block 306, where a determination is made whether the order is processed via direct network function or via a network support system. In various embodiments, this determination is made based on the customer. For example, the system may process orders for some customers via direct network function, but process orders for other customers via the network support system. In other embodiments, an administrator may select or define which orders are to be processed via direct network function or via the network support system. If the order is to be processed via direct network function, then process 300 flows to block 312; but if the order is to be processed via the network support system, then process 300 flows to block 308.

At block 308, one or more high-level networking services are identified for the order. In some embodiments, the order may itself identify the high-level networking services. The high-level networking services may be generalized network functions, such as data management, voice management, messaging management, etc. In other embodiments, the high-level networking service may be associated with networking or device testing. For example, if the customer device is Model_A for Manufacturer_B, then the networking service may be testing various aspects of how that device operates in the network.

In various embodiments, a catalog of high-level and low-level networking services may be maintained. In some embodiments, the catalog may be maintained in a hierarchical structure with low-level networking services being sub-services of high-level networking services. Accordingly, the high-level networking services may be selected from the catalog based on the customer or the order.

Process 300 proceeds next to block 310, where the network support system is employed to establish the high-level networking services. In various embodiments, the network support system may perform various functions and aspects of the communication network. Accordingly, the network support system may provision one or more cloud-computing cores to perform some of the high-level networking services.

After block 310, process 300 flows to decision block 318.

If, at decision block 306, the order is to be processed via direct network function, then process 300 flows from decision block 306 to block 312. At block 312, one or more low-level networking services are identified for the order. In some embodiments, the order may itself identify the low-level networking services. The low-level networking services may be specific network functions related to data management, voice management, messaging management, etc. In other embodiments, the low-level networking service may be associated with specific networking or device testing. In various embodiments, the low-level networking services may be selected from the catalog based on the customer or the order.

Process 300 continues next at block 314, where API end points associated with the identified low-level networking services are selected. In some embodiments, a configuration file may be used to indicate which networking services are associated with or map to which API end points.

In some embodiments, a plurality of low-level networking services may be assigned to a plurality of API end points. In various embodiments, each separate low-level networking service is assigned to one API end point. In at least one embodiment, a low-level networking service may be assigned to multiple API end points.

Moreover, in other embodiments, one or more groups of API end points may be generated. These groups may be referred to a regions of low-level networking services. Each group may include one or more API end points. Accordingly, one or more low-level networking services are associated with each group. In some embodiments, a same API end point may be in two or more different groups. In other embodiments, each group includes a unique set of API end points. In at least one embodiment, one or more customers may be assigned to each group. In some embodiments, this assignment may be for specific customers, such as a list of customer identifiers. In other embodiments, a category or characteristic of customers may be used to assign customers to a group of API end points without assigning specific customers to the group.

Process 300 continues next at block 316, where the selected API end points are employed to provision a cloud-computing core for the identified low-level networking services. In various embodiments, the selected API end points are used to call the cloud-computing infrastructure and request that cloud-computing cores be established to perform the functionality of the associated low-level networking services. In some embodiments, a configuration file may be used to map the API end points to the provisioning of cloud-computing cores to perform the low-level networking service functionality.

After block 316, process 300 proceeds to decision block 318

At decision block 318, a determination is made whether another order is received. If another order is received, process 300 loops to block 302 to process the other order and determine whether the other order is processed via direct network function or via the network support system; otherwise, process 300 terminates or returns to a calling process to perform other actions.

Figure 4:
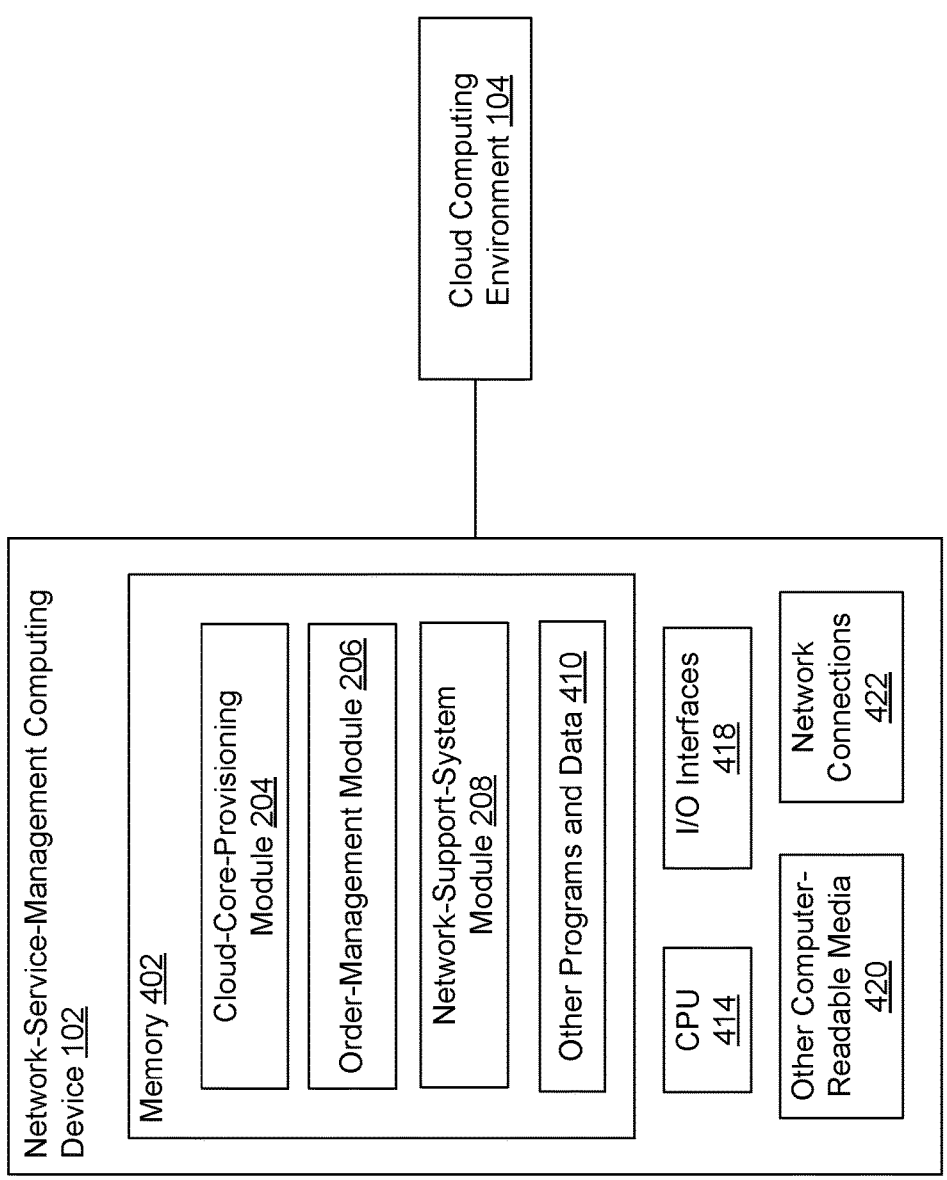
FIG. 4 shows a system diagram that describe various implementations of computing systems for implementing embodiments described herein.

FIG. 4 shows a system diagram that describe various implementations of computing systems for implementing embodiments described herein. System 400 includes a network-service-management computing device 102 and a cloud computing environment 104. As described herein, the cloud computing environment 104 includes computing components and resources that can be utilizes as cloud-computing cores in a virtual computing environment The network-service-management computing device 102 initializes the provisioning of networking services for customer devices. The network-service-management computing device 102 determine whether to process an order for wireless services via a direct network function or via a network support system, as described herein. One or more special-purpose computing systems may be used to implement network-service-management computing device 102. Accordingly, various embodiments described herein may be implemented in software, hardware, firmware, or in some combination thereof. The network-service-management computing device 102 may include memory 402, one or more central processing units (CPUs) 414, I/O interfaces 418, other computer-readable media 420, and network connections 422.

Memory 402 may include one or more various types of non-volatile and/or volatile storage technologies. Examples of memory 402 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. Memory 402 may be utilized to store information, including computer-readable instructions that are utilized by CPU 414 to perform actions, including embodiments described herein.

Memory 402 may have stored thereon cloud-core-provisioning module 204, order-management module 206, and network-support-system module 208. The cloud-core-provisioning module 204 is configured to utilize API end points to call on the cloud computing environment 104 to provision separate cloud-computing cores for separate level-level networking services and to manage the use of those cores, as described herein. The order-management module 206 is configured to manage the receipt of orders for new wireless services and to determine whether the low-level networking services are provisioned via direct network functions or whether the high-level networking services are established via a network support system, as described herein. The network-support-system module 208 is configured to establish high-level networking services without directly provisioning low-level networking services as network functions. Memory 402 may also store other programs and data 410.

Network connections 422 are configured to communicate with other computing devices, such as the cloud computing environment 102, to facilitate the provisioning of cloud-computing cores in the cloud computing environment 104. In various embodiments, the network connections 422 include transmitters and receivers (not illustrated) to send and receive data as described herein. I/O interfaces 418 may include a video interfaces, other data input or output interfaces, or the like. Other computer-readable media 420 may include other types of stationary or removable computer-readable media, such as removable flash drives, external hard drives, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
receiving an order for new wireless service for a customer device;
determining a customer identifier associated with the order;
determining whether to process the order via a direct network function or via a network support system based on the customer identifier;
in response to determining to process the order via the direct network function:
identifying at least one low-level networking service for the order based on the customer identifier; and
provisioning a separate cloud core for each of the at least one low-level networking service; and
in response to determining to process the order via the network support system:
identifying at least one high-level networking service for the order based on the customer identifier; and
employing the network support system to establish the at least one high-level networking service.

2. The method of claim 1, wherein identifying the at least one low-level networking service for the order comprises:
selecting a first application programming interface end point associated with a first target low-level networking service; and
selecting a second application programming interface end point associated with a second target low-level networking service.

3. The method of claim 2, wherein provisioning the separate cloud core for each of the at least one low-level networking service comprises:
employing the first application programming interface end point to call a first cloud core for the first target low-level networking service; and
employing the second application programming interface end point to call a second cloud core for the second target low-level networking service.

4. The method of claim 1, wherein provisioning the separate cloud core for each of the at least one low-level networking service comprises:
employing a first application programming interface end point to provision a first cloud core for a first low-level networking service for the order; and
employing a second application programming interface end point to provision a second cloud core for a second low-level networking service for the order.

5. The method of claim 1, further comprising:
maintaining a catalog of networking services that includes a plurality of high-level networking services and a plurality of low-level networking services.

6. The method of claim 1, further comprising:
maintaining a catalog of networking services in a hierarchical structure with low-level networking services being sub-services of high-level networking services.

7. The method of claim 1, further comprising:
receiving a second order for new wireless service for a second customer device;
determining a second customer identifier associated with the second order;
determining whether to process the second order via the direct network function or via the network support system based on the second customer identifier;
in response to determining to process the second order via the direct network function:
identifying at least one second low-level networking service for the second order based on the second customer identifier; and
provisioning a second separate cloud core for each of the at least one second low-level networking service; and in response to determining to process the second order via the network support system:
  identifying at least one second high-level networking service for the second order based on the second customer identifier; and
  employing the network support system to establish the at least one second high-level networking service.

8. A system comprising:
a memory that stores computer instructions; and
at least one processor that executes the computer instructions to:
  receive an order for new wireless service for a customer device;
  determine a customer identifier associated with the order;
  determine whether to process the order via a direct network function or via a network support system based on the customer identifier;
  in response to determining to process the order via the direct network function:
    identify at least one low-level networking service for the order based on the customer identifier; and
    provision a separate cloud core for each of the at least one low-level networking service; and
  in response to determining to process the order via the network support system:
    identify at least one high-level networking service for the order based on the customer identifier; and
    employ the network support system to establish the at least one high-level networking service.

9. The system of claim 8, wherein at least one processor identifies the at least one low-level networking service for the order by further executing the computer instructions to:
  select a first application programming interface end point associated with a first target low-level networking service; and
  select a second application programming interface end point associated with a second target low-level networking service.

10. The system of claim 9, wherein at least one processor provisions the separate cloud core for each of the at least one low-level networking service by further executing the computer instructions to:
  employ the first application programming interface end point to call a first cloud core for the first target low-level networking service; and
  employ the second application programming interface end point to call a second cloud core for the second target low-level networking service.

11. The system of claim 8, wherein at least one processor provisions the separate cloud core for each of the at least one low-level networking service by further executing the computer instructions to:
  employ a first application programming interface end point to provision a first cloud core for a first low-level networking service for the order; and
  employ a second application programming interface end point to provision a second cloud core for a second low-level networking service for the order.

12. The system of claim 8, wherein the at least one processor further executes the computer instructions to:
  maintain a catalog of networking services that includes a plurality of high-level networking services and a plurality of low-level networking services.

13. The system of claim 8, wherein the at least one processor further executes the computer instructions to:
  maintain a catalog of networking services in a hierarchical structure with low-level networking services being sub-services of high-level networking services.

14. The system of claim 8, wherein the at least one processor further executes the computer instructions to:
  receive a second order for new wireless service for a second customer device;
  determine a second customer identifier associated with the second order;
  determine whether to process the second order via the direct network function or via the network support system based on the second customer identifier;
  in response to determining to process the second order via the direct network function:
    identify at least one second low-level networking service for the second order based on the second customer identifier; and
    provision a second separate cloud core for each of the at least one second low-level networking service; and
  in response to determining to process the second order via the network support system:
    identify at least one second high-level networking service for the second order based on the second customer identifier; and
    employ the network support system to establish the at least one second high-level networking service.

15. A non-transitory computer-readable medium having contents that, when executed by at least one processor, cause the at least one processor to perform a method, the method comprising:
  receiving an order for new wireless service for a customer device;
  determining a customer identifier associated with the order;
  determining whether to process the order via a direct network function or via a network support system based on the customer identifier;
  in response to determining to process the order via the direct network function:
    identifying at least one low-level networking service for the order based on the customer identifier; and
    provisioning a separate cloud core for each of the at least one low-level networking service; and
  in response to determining to process the order via the network support system:
    identifying at least one high-level networking service for the order based on the customer identifier; and
    employing the network support system to establish the at least one high-level networking service.

16. The non-transitory computer-readable medium of claim 15, wherein identifying the at least one low-level networking service for the order comprises:
  selecting a first application programming interface end point associated with a first target low-level networking service; and
  selecting a second application programming interface end point associated with a second target low-level networking service.

17. The non-transitory computer-readable medium of claim 16, wherein provisioning the separate cloud core for each of the at least one low-level networking service comprises:
  employing the first application programming interface end point to call a first cloud core for the first target low-level networking service; and employing the second application programming interface end point to call a second cloud core for the second target low-level networking service.

18. The non-transitory computer-readable medium of claim 15, wherein provisioning the separate cloud core for each of the at least one low-level networking service comprises:

employing a first application programming interface end point to provision a first cloud core for a first low-level networking service for the order; and employing a second application programming interface end point to provision a second cloud core for a second low-level networking service for the order.

19. The non-transitory computer-readable medium of claim 18, the method further comprising:

maintaining a catalog of networking services that includes a plurality of high-level networking services and a plurality of low-level networking services.

20. The non-transitory computer-readable medium of claim 15, the method further comprising:

maintaining a catalog of networking services in a hierarchical structure with low-level networking services being sub-services of high-level networking services.

\* \* \* \* \*